US011345825B2

(12) United States Patent
Suzuki et al.

(10) Patent No.: US 11,345,825 B2
(45) Date of Patent: May 31, 2022

(54) AQUEOUS PIGMENT DISPERSION

(71) Applicant: KAO CORPORATION, Tokyo (JP)

(72) Inventors: Yuki Suzuki, Wakayama (JP);
Teruyuki Fukuda, Wakayama (JP);
Satoshi Kunii, Wakayama (JP); Satoshi Tanaka, Wakayama (JP)

(73) Assignee: KAO CORPORATION, Tokyo (JP)

( * ) Notice: Subject to any disclaimer, the term of this patent is extended or adjusted under 35 U.S.C. 154(b) by 399 days.

(21) Appl. No.: 16/473,897

(22) PCT Filed: Dec. 27, 2017

(86) PCT No.: PCT/JP2017/047123
§ 371 (c)(1),
(2) Date: Jun. 26, 2019

(87) PCT Pub. No.: WO2018/124246
PCT Pub. Date: Jul. 5, 2018

(65) Prior Publication Data
US 2019/0338152 A1    Nov. 7, 2019

(30) Foreign Application Priority Data
Dec. 28, 2016 (JP) .............................. JP2016-256420

(51) Int. Cl.
| C09D 11/326 | (2014.01) |
| B41M 5/00 | (2006.01) |
| C09D 11/033 | (2014.01) |
| C09D 11/037 | (2014.01) |
| C09D 11/107 | (2014.01) |
| C09D 11/38 | (2014.01) |
| C09D 17/00 | (2006.01) |
| C09D 11/023 | (2014.01) |
| C09D 11/322 | (2014.01) |

(52) U.S. Cl.
CPC ......... *C09D 11/326* (2013.01); *B41M 5/0023* (2013.01); *C09D 11/023* (2013.01); *C09D 11/033* (2013.01); *C09D 11/037* (2013.01); *C09D 11/107* (2013.01); *C09D 11/322* (2013.01); *C09D 11/38* (2013.01); *C09D 17/00* (2013.01); *C09D 17/001* (2013.01); *C09D 17/005* (2013.01); *B41M 5/00* (2013.01)

(58) Field of Classification Search
CPC ..... B41M 5/0023; B41M 5/00; C09D 11/326; C09D 11/033; C09D 11/037; C09D 11/107; C09D 11/38; C09D 17/001; C09D 17/005; C09D 11/023; C09D 11/322; C09D 17/00
See application file for complete search history.

(56) References Cited

U.S. PATENT DOCUMENTS 7,008,994 B1    3/2006 Waki
2014/0139595 A1    5/2014 Hong et al.

FOREIGN PATENT DOCUMENTS

| CN | 103436153 A | 12/2013 |
| JP | 7-82516 A | 3/1995 |
| JP | 11-152424 A | 6/1999 |
| JP | 2001-302876 A | 10/2001 |
| JP | 2003-12994 A | 1/2003 |
| JP | 2014-173051 A | 9/2014 |
| JP | 2015-30777 A | 2/2015 |
| JP | 2016-505651 A | 2/2016 |
| WO | WO 99/52966 A1 | 10/1999 |
| WO | WO 2006/084523 A1 | 8/2006 |

OTHER PUBLICATIONS

Machine English translation of JP 2014-173051, Kido et al., Sep. 22, 2014.*
Machine English translation of JP 1999-152424, Takao et al., Jun. 8, 1999.*
Extended European Search Report for Application No. 17887235.4, dated Jul. 1, 2020.
Xia et al., "Fine Polymer Chemistry and Application," 1st Edition, Sep. 30, 2000, p. 44 (3 pages total).
International Search Report (PCT/ISA/210) issued in PCT/JP2017/047123, dated Mar. 13, 2018.

* cited by examiner

Primary Examiner — Patrick D Niland
(74) Attorney, Agent, or Firm — Birch, Stewart, Kolasch & Birch, LLP

(57) ABSTRACT

The present invention provides a pigment water dispersion that is excellent in dispersion stability, and also excellent in ejection properties even when used as an ink for ink-jet printing. The present invention relates to [1] a pigment water dispersion containing (A) a pigment, (B) a carboxy group-containing crosslinked polymer and (C) an alkyl group-containing ethanolamine having a pKa of not less than 8.7, [2] a water-based ink containing the pigment water dispersion, an organic solvent and a surfactant, and [3] a process for producing a pigment water dispersion, including step (I) of subjecting a mixture containing the pigment (A), a crosslinkable polymer, the aforementioned ethanolamine (C), an organic solvent and water to dispersion treatment, thereby obtaining a dispersion of pigment-containing polymer particles containing the pigment (A) and the crosslinkable polymer that is adhered onto the pigment (A); step (II) of removing the organic solvent from the obtained dispersion, thereby obtaining a water dispersion of the pigment-containing polymer particles; and step (III) of further subjecting the polymer to crosslinking reaction with a crosslinking agent, thereby obtaining the pigment water dispersion containing pigment-containing crosslinked polymer (B) particles.

15 Claims, No Drawings

AQUEOUS PIGMENT DISPERSION

FIELD OF THE INVENTION

The present invention relates to a pigment water dispersion, a water-based ink and a process for producing the pigment water dispersion.

BACKGROUND OF THE INVENTION

In order to overcome disadvantages of conventional water-based coating materials or inks, such as deterioration in their properties such as alkali resistance and solvent resistance, there are known, for example, aqueous coating material compositions that are improved in solvent resistance by dispersing a pigment with crosslinked resin particles containing an ionic group to suppress flocculation of the pigment during storage thereof, aqueous crosslinked resins that are obtained by subjecting end groups of a urethane-based polymer containing an end isocyanate group to crosslinking reaction, or the like.

In any of these conventional compositions or resins, the crosslinked resin is used as a dispersant for the pigment. However, when the pigment is dispersed with such a crosslinked resin, it tends to be difficult to atomize the pigment particles since the crosslinked resin is hardly adsorbed onto the pigment owing to a long molecular chain of the crosslinked resin itself, so that the resulting coating materials or inks tend to suffer from problems such as poor temporal stability thereof.

To solve these problems, there have been conventionally proposed pigment dispersions using a tertiary organic amine.

For example, WO 1999/52966A (Patent Literature 1) aims at improving alkali resistance, solvent resistance and temporal stability of pigment dispersions, and discloses an aqueous pigment dispersion that is produced by dispersing a pigment with a resin obtained by neutralizing a carboxy group-containing thermoplastic resin with an organic amine and then subjecting the resin to crosslinking reaction with a crosslinking agent.

JP 2016-505651A (Patent Literature 2) aims at increasing shelf life of a self-crosslinkable ink, and discloses a dispersion that contains a pigment, a carboxy group-containing polymer, a crosslinking agent capable of undergoing crosslinking reaction with the carboxy group, an inhibitor containing a tertiary amine such as triethanolamine, and a liquid carrier.

SUMMARY OF THE INVENTION

The present invention relates to [1] a pigment water dispersion containing (A) a pigment, (B) a carboxy group-containing crosslinked polymer and (C) an alkyl group-containing ethanolamine having an acid dissociation constant (pKa) of not less than 8.7, [2] a water-based ink containing the pigment water dispersion, an organic solvent and a surfactant, and [3] a process for producing the pigment water dispersion.

DETAILED DESCRIPTION OF THE INVENTION

The technologies described in the Patent Literatures 1 and 2 have failed to sufficiently improve dispersion stability of the pigment dispersions, and have posed such a problem that when using these pigment dispersions in an ink for ink-jet printing, the resulting ink tends to be deteriorated in ejection stability, etc.

The present invention relates to a pigment water dispersion that is excellent in dispersion stability, and also excellent in ejection stability even when used as an ink for ink-jet printing.

The present inventors have found that when using (C) an alkyl group-containing ethanolamine having an acid dissociation constant (pKa) of not less than 8.7, it is possible to obtain a pigment water dispersion that is free of the aforementioned conventional problems.

That is, the present invention relates to the following aspects [1] to [3]. [1] A pigment water dispersion containing (A) a pigment, (B) a carboxy group-containing crosslinked polymer and (C) an alkyl group-containing ethanolamine having an acid dissociation constant (pKa) of not less than 8.7. [2] A water-based ink containing the pigment water dispersion according to the above aspect [1], an organic solvent and a surfactant. [3] A process for producing a pigment water dispersion, including the following steps (I) to (III);

Step (I); subjecting a mixture containing (A) a pigment, a carboxy group-containing crosslinkable polymer, (C) an alkyl group-containing ethanolamine having an acid dissociation constant (pKa) of not less than 8.7, an organic solvent and water to dispersion treatment, thereby obtaining a dispersion of pigment-containing polymer particles containing the pigment (A) and the crosslinkable polymer that is adhered onto the pigment (A);

Step (II); removing the organic solvent from the dispersion obtained in the step (I), thereby obtaining a water dispersion of the pigment-containing polymer particles; and Step (III); subjecting the crosslinkable polymer constituting the pigment-containing polymer particles obtained in the step (II) to crosslinking reaction with a crosslinking agent, thereby obtaining the pigment water dispersion containing pigment-containing crosslinked polymer (B) particles.

In accordance with the present invention, it is possible to provide a pigment water dispersion that is excellent in dispersion stability, and also excellent in ejection stability even when used as an ink for ink-jet printing.

[Pigment Water Dispersion]

The pigment water dispersion of the present invention contains (A) a pigment, (B) a carboxy group-containing crosslinked polymer and (C) an alkyl group-containing ethanolamine having an acid dissociation constant (pKa) of not less than 8.7.

The pigment water dispersion of the present invention is excellent in dispersion stability, and also excellent in ejection properties even when used as an ink for ink-jet printing. The reason why the aforementioned advantageous effects can be attained by the present invention is considered as follows, though it is not clearly determined.

In the pigment water dispersion of the present invention, the alkyl group-containing ethanolamine (C) having an acid dissociation constant (pKa) of not less than 8.7 is used as a neutralizing agent for the carboxy group-containing crosslinkable polymer. When using the ethanolamine (C) as the neutralizing agent, it is considered that the degree of dissociation of the crosslinkable polymer is enhanced, so that the pigment (A) can be improved in dispersion stability.

In addition, as the water-based ink is being continuously dried, charge repulsion of the polymer adsorbed onto the pigment (A) is dissipated, and the viscosity of the ink is usually increased. However, if the aforementioned ethanolamine (C) is used in the water-based ink, the charge repulsion of the crosslinked polymer (B) obtained by crosslinking the crosslinkable polymer is maintained, and the resulting ink hardly suffers from increase in viscosity thereof even as the ink is being dried. As a result, it is considered that the ink is excellent in ejection properties even when ejecting the ink from the ink-jet printing apparatus.

<Pigment (A)>

The pigment (A) used in the present invention may be either an organic pigment or an inorganic pigment. In addition, the organic or inorganic pigment may be used in combination with an extender pigment, if required.

Examples of the inorganic pigment include carbon blacks, metal oxides, metal sulfides and metal chlorides. Of these inorganic pigments, carbon blacks are preferably used, in particular, for black water-based inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the names of C.I. Pigment Yellow, C.I. Pigment Red, C.I. Pigment Violet, C.I. Pigment Blue and C.I. Pigment Green with various part numbers. Examples of the extender pigment include silica, calcium carbonate and talc.

As the pigment, there may also be used a so-called self-dispersible pigment. The "self-dispersible pigment" as used herein means a pigment onto a surface of which one or more anionic hydrophilic groups or cationic hydrophilic groups are bonded either directly or through the other atom group to thereby render the pigment dispersible in an aqueous medium without using a surfactant or a resin. In this case, in particular, the anionic hydrophilic group is preferably a carboxy group ($-COOM^1$) and a sulfonic acid group ($-SO_3M^1$) wherein $M^1$ is a hydrogen atom, an alkali metal or ammonium, and the cationic hydrophilic group is preferably a quaternary ammonium group.

The aforementioned pigments may be used alone or in the form of a mixture of any two or more thereof.

<Carboxy Group-Containing Crosslinkable Polymer, and Crosslinked Polymer (B)>

The carboxy group-containing crosslinkable polymer (hereinafter also referred to merely as a "crosslinkable polymer") is in the form of an uncrosslinked polymer as a precursor of the crosslinked polymer (B) which is formed by crosslinking the crosslinkable polymer with a crosslinking agent, or is in the form of an uncrosslinked polymer as a precursor of the crosslinked polymer (B) which is formed by subjecting the crosslinkable polymer to self-crosslinking reaction without using a crosslinking agent. Among these crosslinkable polymers, preferred is a polymer that is capable of forming the crosslinked polymer (B) by crosslinking the polymer with a crosslinking agent.

The acid value of the crosslinkable polymer is preferably not less than 150 mgKOH/g and more preferably not less than 170 mgKOH/g, and is also preferably not more than 250 mgKOH/g, and more preferably not more than 230 mgKOH/g, from the viewpoint of improving dispersion stability of the resulting pigment water dispersion.

The acid value (mgKOH/g) of the crosslinkable polymer is calculated according to the following calculation formula (1):

$$\text{Acid value(mgKOH/g)} = [(\text{number of moles of salt-forming group in 1g of polymer}) \times (\text{molecular weight of potassium hydroxide})(56.1) \times 1000] \quad (1)$$

The crosslinkable polymer used in the present invention is preferably a vinyl-based polymer that contains a constitutional unit derived from (a) an ionic monomer (hereinafter also referred to merely as a "component (a)") and a constitutional unit derived from (b) a hydrophobic monomer (hereinafter also referred to merely as a "component (b)"), and more preferably a vinyl-based polymer that further contains a constitutional unit derived from (c) a nonionic monomer (hereinafter also referred to merely as a "component (c)") in addition to the constitutional units derived from the components (a) and (b), from the viewpoint of improving dispersion stability of the pigment water dispersion as well as from the viewpoint of improving ejection properties of the resulting ink. The vinyl-based polymer may be produced by copolymerizing a monomer mixture containing the component (a) and the component (b), and further containing the component (c), if required (such a mixture is hereinafter also referred to merely as a "monomer mixture").

The constitutional units of the crosslinkable polymer are the same as the constitutional units of the crosslinked polymer (B). Therefore, in the following description, the monomer component of the crosslinkable polymer may also be read as the monomer component of the crosslinked polymer (B).

[Ionic Monomer (a)]

The ionic monomer (a) may be used as a monomer component of the crosslinkable polymer from the viewpoint of improving dispersion stability of the pigment water dispersion as well as from the viewpoint of improving storage stability of the resulting ink.

The ionic monomer (a) is a monomer containing a group that can be converted into an ion under any of acid, neutral and alkaline conditions (hereinafter also referred to merely as an "ionic group"), and preferably such a monomer that a solubility in water of either the monomer or a salt thereof as measured by dissolving the monomer or salt in 100 g of ion-exchanged water at 25° C. is not less than 1 g, preferably not less than 5 g and more preferably not less than 10 g.

The ionic monomer (a) preferably contains a reactive group that is capable of reacting with the below-mentioned crosslinking agent.

Examples of the ionic monomer (a) include an anionic monomer and a cationic monomer which both contain the aforementioned reactive group. Among these ionic monomers, from the viewpoint of improving dispersion stability of the pigment water dispersion as well as from the viewpoint of improving storage stability and ejection properties of the resulting ink, preferred is the anionic monomer containing the aforementioned reactive group.

Examples of the anionic monomer include a carboxylic acid monomer, a sulfonic acid monomer and a phosphoric acid monomer, etc. Since the crosslinkable polymer contains a carboxy group, the anionic monomer includes at least a carboxylic acid monomer.

Specific examples of the carboxylic acid monomer include acrylic acid, methacrylic acid, crotonic acid, itaconic acid, maleic acid, fumaric acid, citraconic acid and 2-methacryloyloxymethylsuccinic acid.

Specific examples of the sulfonic acid monomer include styrenesulfonic acid, 2-acrylamido-2-methylpropanesulfonic acid and 3-sulfopropyl (meth) acrylate.

Specific examples of the phosphoric acid monomer include vinylphosphonic acid, vinyl phosphate, bis(methacryloxyethyl)phosphate, diphenyl-2-acryloyloxyethyl phosphate and diphenyl-2-methacryloyloxyethyl phosphate.

Among the aforementioned anionic monomers, from the viewpoint of improving dispersion stability of the pigment water dispersion as well as from the viewpoint of improving storage stability of the resulting ink, preferred is the carboxylic acid monomer, more preferred is at least one compound selected from the group consisting of acrylic acid and methacrylic acid, and even more preferred is methacrylic acid.

More specifically, the crosslinkable polymer and the crosslinked polymer (B) are respectively preferably in the form of a vinyl-based copolymer containing a constitutional unit derived from at least one compound selected from the group consisting of acrylic acid and methacrylic acid and a constitutional unit derived from the hydrophobic monomer (b), and more preferably in the form of a vinyl-based copolymer containing a constitutional unit derived from methacrylic acid and a constitutional unit derived from the hydrophobic monomer (b).

Meanwhile, the term "(meth)acrylate" as used in the present specification means "at least one compound selected from the group consisting of an acrylate and a methacrylate", and the "(meth)acrylate" as described hereinafter is also defined in the same way.

[Hydrophobic Monomer (b)]

The hydrophobic monomer (b) may be used as a monomer component of the crosslinkable polymer from the viewpoint of improving dispersion stability of the pigment water dispersion as well as from the viewpoint of improving storage stability of the resulting ink.

The hydrophobic monomer (b) means such a monomer whose solubility in water is less than 10 g as measured by dissolving the monomer in 100 g of ion-exchanged water at 25° C. The solubility in water of the hydrophobic monomer (b) as measured by dissolving the monomer in 100 g of ion-exchanged water at 25° C. is preferably not more than 5 g and more preferably not more than 1 g from the viewpoint of improving adsorptivity of the polymer onto the surface of the pigment. Examples of the hydrophobic monomer (b) include an aromatic group-containing monomer, an alkyl (meth)acrylate and the like.

The aromatic group-containing monomer is preferably a vinyl monomer containing an aromatic group having 6 to 22 carbon atoms, and more preferably a styrene-based monomer or an aromatic group-containing (meth)acrylate, etc.

As the styrene-based monomer, preferred is at least one monomer selected from the group consisting of styrene and 2-methyl styrene, and more preferred is styrene.

Also, as the aromatic group-containing (meth)acrylate, preferred is at least one monomer selected from the group consisting of benzyl (meth)acrylate and phenoxyethyl (meth)acrylate, and more preferred is benzyl (meth)acrylate. In addition, the aromatic group-containing (meth)acrylate is also preferably used in combination with the styrene-based monomer.

As the alkyl (meth)acrylate, preferred are those alkyl (meth)acrylates containing an alkyl group having 1 to 22 carbon atoms, and more preferred are those alkyl (meth) acrylates containing an alkyl group having 6 to 18 carbon atoms. Examples of the alkyl (meth)acrylate include methyl (meth)acrylate, ethyl (meth)acrylate, (iso)propyl (meth) acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth) acrylate, (iso)dodecyl (meth)acrylate, (iso)stearyl (meth) acrylate and the like.

Meanwhile, the terms "(iso- or tertiary)" and "(iso)" as used herein mean both the structure in which any of the groups expressed by "iso- or tertiary-" and "iso" respectively are present, and the structure in which none of these groups are present (i.e., normal).

As the hydrophobic monomer (b), a macromonomer is also preferably used from the viewpoint of improving dispersion stability of the pigment water dispersion.

The macromonomer is in the form of a compound containing a polymerizable functional group at one terminal end thereof and having a number-average molecular weight of not less than 500 and not more than 100,000, and preferably in the form of a compound containing a polymerizable functional group at one terminal end thereof and having a number-average molecular weight of not less than 1,000 and not more than 10,000. Meanwhile, the number-average molecular weight of the macromonomer is the value that is measured by gel permeation chromatography using chloroform containing 1 mmol/L of dodecyl dimethylamine as a solvent and using a polystyrene as a reference standard substance.

As the polymerizable functional group bonded to one terminal end of the macromonomer, preferred is an acryloyloxy group or a methacryloyloxy group, and more preferred is a methacryloyloxy group.

As the macromonomer, preferred is at least one macromer selected from the group consisting of an aromatic group-containing monomer-based macromer and a silicone-based macromer, and more preferred is an aromatic group-containing monomer-based macromer.

Examples of an aromatic group-containing monomer constituting the aromatic group-containing monomer-based macromonomer include the same aromatic group-containing monomers as described with respect to the aforementioned hydrophobic monomer (b). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

Examples of the silicone-based macromonomer include organopolysiloxanes containing a polymerizable functional group at one terminal end thereof, etc.

[Nonionic Monomer (c)]

The nonionic monomer (c) is a monomer that contains no ionic group, and is preferably such a monomer whose solubility in water is not less than 10 g as measured by dissolving the monomer in 100 g of ion-exchanged water at 25° C.

The nonionic monomer (c) preferably includes those monomers containing at least one group selected from the group consisting of a hydroxy group and a polyalkyleneoxy group. Specific examples of the nonionic monomer (c) include hydroxyalkyl (meth)acrylates such as 2-hydroxyethyl (meth)acrylate and 3-hydroxypropyl (meth)acrylate; polyalkylene glycol mono(meth)acrylates such as polypropylene glycol (n=2 to 30 wherein n represents an average molar number of addition of an oxyalkylene group: hereinafter defined in the same way) mono(meth)acrylates and polyethylene glycol (n=2 to 30) mono(meth)acrylates; alkoxy polyalkylene glycol (meth)acrylates such as methoxy polyethylene glycol (n=1 to 30) (meth)acrylates; and aralkoxy polyalkylene glycol (meth)acrylates such as phenoxy (ethylene glycol/propylene glycol copolymer) (n=1 to 30 in which n for ethylene glycol: n=1 to 29) (meth)acrylates. Among these nonionic monomers, preferred are polyalkylene glycol mono(meth)acrylates, and more preferred are polypropylene glycol (n=2 to 30) mono(meth)acrylates and polyethylene glycol (n=2 to 30) mono(meth)acrylates.

Specific examples of commercially available products of the nonionic monomer (c) include "NK ESTER M-20G", "NK ESTER M-40G", "NK ESTER M-90G" and "NK ESTER M-230G" and the like all available from Shin-Nakamura Chemical Co., Ltd., etc.; as well as "BLEMMER PE-90", "BLEMMER PE-200", "BLEMMER PE-350" and the like; "BLEMMER PME-100", "BLEMMER PME-200", "BLEMMER PME-400" and the like; "BLEMMER PP-500", "BLEMMER PP-800", "BLEMMER PP-1000" and the like; "BLEMMER AP-150", "BLEMMER AP-400", "BLEMMER AP-550" and the like; and "BLEMMER 50PEP-300", "BLEMMER 50POEP-800B", "BLEMMER 43PAPE-600B" and the like all available from NOF Corporation, etc.

The aforementioned components (a) to (c) may be respectively used alone or in combination of any two or more thereof.

(Production of Crosslinkable Polymer)

The crosslinkable polymer may be produced by copolymerizing the aforementioned monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably an organic polar solvent. If the organic polar solvent is miscible with water, the organic solvent may be used in the form of a mixture with water. Examples of the organic polar solvent include aliphatic alcohols having 1 to 3 carbon atoms, ketones having 3 to 5 carbon atoms, ethers and esters. Among these organic polar solvents, preferred are the aliphatic alcohols, the ketones, or a mixed solvent of any of these organic solvents with water, and more preferred is methyl ethyl ketone or a mixed solvent of methyl ethyl ketone and water.

The polymerization may be carried out in the presence of a conventionally known polymerization initiator or chain transfer agent.

In addition, the type of a polymerization chain of polymers obtained from the respective monomers to be polymerized is not particularly limited, and may be of any polymerization type including a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or in an atmosphere of an inert gas such as argon.

After completion of the polymerization reaction, the polymer produced may be isolated from the obtained reaction solution by conventionally known methods such as reprecipitation and removal of the solvent by distillation, etc.

(Contents of Respective Components in Crosslinkable Polymer)

Upon production of the crosslinkable polymer, the contents of the ionic monomer (a), the hydrophobic monomer (b) and the nonionic monomer (c) in the monomer mixture (contents of non-neutralized components; hereinafter defined in the same way), i.e., the contents of the constitutional units derived from the components (a) to (c) in the crosslinkable polymer, are as follows from the viewpoint of improving dispersion stability of the pigment water dispersion and the resulting ink as well as from the viewpoint of improving ejection properties of the ink.

The content of the component (a) is preferably not less than 10% by mass, more preferably not less than 13% by mass and even more preferably not less than 15% by mass, and is also preferably not more than 25% by mass, more preferably not more than 23% by mass and even more preferably not more than 21% by mass.

The content of the component (b) is preferably not less than 40% by mass, more preferably not less than 45% by mass and even more preferably not less than 48% by mass, and is also preferably not more than 85% by mass, more preferably not more than 80% by mass and even more preferably not more than 75% by mass.

The content of the component (c) is preferably not less than 0.1% by mass, more preferably not less than 10% by mass and even more preferably not less than 20% by mass, and is also preferably not more than 40% by mass, more preferably not more than 35% by mass and even more preferably not more than 31% by mass.

The mass ratio of the component (b) to the component (a) [component (b)/component (a)] is preferably not less than 0.5, more preferably not less than 1.0, even more preferably not less than 1.5 and further even more preferably not less than 2.0, and is also preferably not more than 5.0, more preferably not more than 4.0 and even more preferably not more than 3.5.

The number-average molecular weight of the crosslinkable polymer is preferably not less than 2,000, more preferably not less than 3,000, even more preferably not less than 4,000, further even more preferably not less than 8,000 and still further even more preferably not less than 10,000, and is also preferably not more than 100,000, more preferably not more than 50,000, even more preferably not more than 30,000 and further even more preferably not more than 20,000, from the viewpoint of improving dispersion stability of the pigment water dispersion and the resulting ink as well as from the viewpoint of enhancing optical density of the printed characters or images.

Meanwhile, the number-average molecular weight of the crosslinkable polymer may be measured by the method described in Examples below.

The crosslinkable polymer used in the present invention may be present in any form as long as the polymer is contained in the water dispersion. The crosslinkable polymer is preferably used as a dispersant for the pigment (A). In the case where the crosslinkable polymer is used as the dispersant, it is preferred that after neutralizing the ionic group derived from the ionic monomer (a) in the crosslinkable polymer with (C) an alkyl group-containing ethanolamine having an acid dissociation constant (pKa) of not less than 8.7 (neutralizing agent), the thus neutralized crosslinkable polymer is mixed with the pigment (A) to disperse the pigment therein, and then the crosslinkable polymer is crosslinked with a crosslinking agent to thereby obtain the pigment-containing crosslinked polymer (B) particles. As the crosslinking agent, there may be used those crosslinking agents as described hereinlater in the paragraph "Production of Pigment Water Dispersion". The crosslinked polymer (B) is preferably such a polymer as obtained by crosslinking the crosslinkable polymer with a compound containing two or more epoxy groups in a molecule thereof.

<Alkyl Group-Containing Ethanolamine Having pKa of not less than 8.7>

The alkyl group-containing ethanolamine (C) having an acid dissociation constant (pKa) of not less than 8.7 (hereinafter also referred to merely as an "ethanolamine (C)") is preferably used as a neutralizing agent for the carboxy group of the crosslinkable polymer from the viewpoint of improving stability and ejection properties of the pigment water dispersion.

The acid dissociation constant (pKa) of the ethanolamine (C) is preferably not less than 8.72 and more preferably not less than 8.8, and is also preferably not more than 9.2 and more preferably not more than 9.0, from the viewpoint of improving stability and ejection properties of the pigment water dispersion.

Meanwhile, the acid dissociation constant (pKa) of the ethanolamine (C) may be measured by the method described in Examples below.

The number of carbon atoms of the alkyl group in the ethanolamine (C) in terms of a total number of carbon atoms of the alkyl group(s) contained in the ethanolamine (C) is preferably not less than 3 and more preferably not less than 4 from the viewpoint of improving stability and ejection properties of the pigment water dispersion, and is also preferably not more than 20, more preferably not more than 12, even more preferably not more than 8 and further even more preferably not more than 6 from the viewpoint of improving storage stability of the pigment water dispersion.

In addition, the ethanolamine (C) preferably contains at least an alkyl group having not less than 2 carbon atoms, more preferably at least an alkyl group having not less than 3 carbon atoms, and even more preferably at least an alkyl group having not less than 4 carbon atoms The ethanolamine (C) is preferably at least one compound selected from the group consisting of monoethanolamine and diethanolamine. Among these compounds as the ethanolamine (C), from the viewpoint of improving stability and ejection properties of the pigment water dispersion, more preferred is diethanolamine.

The ethanolamine (C) is preferably at least one compound selected from the group consisting of monoethanolamine and diethanolamine which contain an alkyl group preferably having not less than 4 and not more than 20 carbon atoms.

Specific examples of the ethanolamine (C) include alkyl ethanolamines such as butyl ethanolamine (pKa; 10.03), t-butyl ethanolamine, octyl ethanolamine, decyl ethanolamine and dodecyl ethanolamine; and alkyl diethanolamines such as n-butyl diethanolamine (pKa; 8.86), t-butyl diethanolamine (pKa; 8.74), N-hexyl diethanolamine, N-octyl diethanolamine, N-decyl diethanolamine, N-coconutalkyl diethanolamine and stearyl diethanolamine. Among these compounds as the ethanolamine (C), preferred are diethanolamines having pKa of not less than 8.7 and preferably not less than 8.8 and containing an alkyl chain having not less than 4 and not more than 8 carbon atoms, and more preferred is n-butyl diethanolamine.

<Production of Pigment Water Dispersion>

The process for producing the pigment water dispersion according to the present invention is not particularly limited. However, the pigment water dispersion of the present invention can be efficiently produced by the process including the following steps (I) to (III);

Step (I); subjecting a mixture containing the pigment (A), a carboxy group-containing crosslinkable polymer, the ethanolamine (C) having an acid dissociation constant (pKa) of not less than 8.7 and containing an alkyl group having not less than 3 and not more than 20 carbon atoms, an organic solvent and water to dispersion treatment, thereby obtaining a dispersion of pigment-containing polymer particles containing the pigment (A) and the crosslinkable polymer that is adhered onto the pigment (A);

Step (II); removing the organic solvent from the dispersion obtained in the step (I), thereby obtaining a water dispersion of the pigment-containing polymer particles; and Step (III); subjecting the crosslinkable polymer constituting the pigment-containing polymer particles obtained in the step (II) to crosslinking reaction with a crosslinking agent, thereby obtaining the pigment water dispersion containing pigment-containing crosslinked polymer (B) particles.

<Step (I)>

The step (I) is the step of subjecting a mixture containing the pigment (A), a carboxy group-containing crosslinkable polymer, the alkyl group-containing ethanolamine (C) having an acid dissociation constant (pKa) of not less than 8.7, an organic solvent and water (hereinafter also referred to merely as a "mixture A") to dispersion treatment, thereby obtaining a dispersion of pigment-containing polymer particles containing the pigment (A) and the crosslinkable polymer that is adhered onto the pigment (A).

In the step (I), there is preferably used such a method in which the crosslinkable polymer is first dissolved in the organic solvent, and then the pigment (A), the ethanolamine (C) and water are added, if required together with a surfactant, etc., to the resulting organic solvent solution to thereby obtain a dispersion of an oil-in-water type. The order of addition of the respective components to the aforementioned organic solvent solution is not particularly limited, and it is preferred that the ethanolamine (C), water and the pigment (A) are successively added in this order.

As the neutralizing agent, the ethanolamine (C) may be used in combination with a neutralizing agent other than the ethanolamine (C), such as the aforementioned metal hydroxides.

Examples of the organic solvent include alcohol solvents such as ethanol, isopropanol and isobutanol, ketone solvents such as acetone, methyl ethyl ketone, methyl isobutyl ketone and diethyl ketone, and ether solvents such as dibutyl ether, tetrahydrofuran and dioxane. Among these organic solvents, preferred are methyl ethyl ketone and methyl isobutyl ketone.

The contents of the respective components in the mixture A are as follows.

The content of the pigment (A) in the pigment water dispersion is preferably not less than 2% by mass, more preferably not less than 3% by mass and even more preferably not less than 5% by mass, and is also preferably not more than 35% by mass, more preferably not more than 30% by mass and even more preferably not more than 25% by mass, from the viewpoint of enhancing optical density of the pigment water dispersion when used for printing.

The content of the crosslinkable polymer in the mixture A is preferably not less than 2% by mass and more preferably not less than 3% by mass, and is also preferably not more than 40% by mass and more preferably not more than 20% by mass, from the viewpoint of improving stability and ejection properties of the pigment water dispersion.

The content of the ethanolamine (C) (as a neutralizing agent) in the mixture A is preferably not less than 0.1% by mass, more preferably not less than 0.5% by mass and even more preferably not less than 1.0% by mass, and is also preferably not more than 12% by mass, more preferably not more than 10% by mass and even more preferably not more than 5% by mass, from the viewpoint of improving stability and ejection properties of the pigment water dispersion.

In the case where the crosslinkable polymer is neutralized, the degree of neutralization of the crosslinkable polymer is not particularly limited. However, it is preferred that the pH value of the finally obtained pigment water dispersion as liquid properties thereof is adjusted to the range of 4.5 to 10. The pH value of the pigment water dispersion may also be determined from the desired degree of neutralization of the crosslinkable polymer.

The metal hydroxide such as sodium hydroxide may also be used as the neutralizing agent in combination with the ethanolamine (C). However, in such a case, the content of the ethanolamine (C) used in the neutralizing agent is preferably not less than 50 mol %, more preferably not less than 70 mol % and even more preferably not less than 90 mol %.

The degree of neutralization of the ionic group (carboxy group) in the crosslinkable polymer is preferably not less than 30 mol %, more preferably not less than 40 mol % and even more preferably not less than 50 mol %, and is also preferably not more than 300 mol %, more preferably not more than 200 mol % and even more preferably not more than 150 mol %, from the viewpoint of improving dispersion stability and storage stability of the pigment water dispersion and the resulting ink.

The degree of neutralization as used herein means the value calculated by dividing a mole equivalent of the neutralizing agent by a molar amount of the ionic group of the crosslinkable polymer. The degree of neutralization of the ionic group in the crosslinkable polymer might exceed 100 mol % depending upon the values upon the aforementioned calculation.

The mass ratio of the pigment (A) to the crosslinkable polymer [pigment (A)/crosslinkable polymer] is preferably from 50/50 to 90/10, more preferably from 55/45 to 85/15 and even more preferably from 60/40 to 80/20, from the viewpoint of improving dispersion stability of the pigment water dispersion.

The content of the organic solvent in the mixture A is preferably not less than 1% by mass, more preferably not less than 2% by mass and even more preferably not less than 3% by mass, and is also preferably not more than 30% by mass, more preferably not more than 20% by mass and even more preferably not more than 15% by mass.

The content of water in the mixture A is preferably not less than 20% by mass and more preferably not less than 30% by mass, and is also preferably not more than 90% by mass and more preferably not more than 80% by mass.

In addition, the content of non-volatile components in the mixture A is preferably from 3 to 35%, more preferably from 5 to 30% and even more preferably from 10 to 25%. Meanwhile, the "content of non-volatile components" in the mixture A is the value calculated according to the following calculation formula (2).

Content of non-volatile components (% by mass)= [(total mass of polymer, colorant, and optional neutralizing agent that may be added, if required)/(mass of colorant dispersion)]×100    (2)

The method for dispersing the mixture A in the step (I) is not particularly limited. The particles in the dispersion may be atomized into fine particles having a desired average particle size only by subjecting the mixture A to substantial dispersion treatment. However, it is preferred that the mixture A is first subjected to preliminary dispersion treatment, and then further subjected to the substantial dispersion treatment by applying a shear stress thereto so as to control the average particle size of the particles in the dispersion to a desired value. The temperature used in the dispersion treatment in the step (I) is preferably from 0 to 40° C. and more preferably from 5 to 30° C. The dispersing time of the dispersion treatment is preferably from 1 to 30 hours and more preferably from 2 to 25 hours.

When subjecting the mixture A to the preliminary dispersion treatment, there may be used ordinary mixing and stirring devices such as an anchor blade. Of these mixing and stirring devices, preferred are high-speed stirring mixers such as "Ultra Disper" (tradename) available from Asada Iron Works Co., Ltd., "Ebara Milder" (tradename) available from Ebara Corporation and "TK Homomixer" (tradename) available from Primix Co., Ltd., etc.

Examples of the means for applying a shear stress to the mixture A in the substantial dispersion treatment include kneading machines such as roll mills, beads mills, kneaders and extruders, homo-valve-type high-pressure homogenizers such as typically "High-Pressure Homogenizer" (tradename) available from Izumi Food Machinery Co., Ltd., and "Mini-Labo 8.3H Model" (tradename) available from Rannie Corporation, and chamber-type high-pressure homogenizers such as "MICROFLUIDIZER" (tradename) available from Microfluidics Corporation and "Nanomizer" (tradename) available from Nanomizer Inc. These devices may be used in combination of any two or more thereof. Among these devices, the high-pressure homogenizers are preferably used from the viewpoint of reducing the particle size of the pigment.

<Step (II)>

The step (II) is the step of removing the organic solvent from the dispersion obtained in the step (I), thereby obtaining a water dispersion of the pigment-containing polymer particles.

In the step (II), the organic solvent is removed from the obtained dispersion by any conventionally known methods, so that it is possible to obtain the water dispersion of the pigment-containing polymer particles. The organic solvent is preferably substantially completely removed from the thus obtained water dispersion. However, the residual organic solvent may be present in the water dispersion unless the objects and advantageous effects of the present invention are adversely affected by the residual organic solvent. The content of the residual organic solvent in the water dispersion is preferably not more than 0.1% by mass and more preferably not more than 0.05% by mass. In addition, if required, the dispersion may be subjected to heating and stirring treatments before removing the organic solvent therefrom by distillation.

In the thus-obtained water dispersion, the solid components constituted of the pigment-containing polymer particles are dispersed in a medium containing water as a main medium. The configuration of the polymer particles is not particularly limited, and the polymer particles may have any configuration as long as the particles are formed of at least the pigment and the polymer. Examples of the configuration of the polymer particles include the particle configuration in which the pigment is enclosed (encapsulated) in the polymer, the particle configuration in which the pigment is uniformly dispersed in the polymer, the particle configuration in which the pigment is exposed onto a surface of the respective polymer particles, as well as a mixed configuration of these particle configurations.

<Step (III)>

The step (III) is the step of subjecting the crosslinkable polymer constituting the pigment-containing polymer particles obtained in the step (II) to crosslinking reaction with a crosslinking agent, thereby obtaining the pigment water dispersion containing the pigment-containing crosslinked polymer (B) particles.

(Crosslinking Agent)

The crosslinking agent used in the step (III) is a compound that is capable of reacting with a reactive functional group of the crosslinkable polymer, such as a carboxy group, etc.

The number of reactive functional groups contained in the crosslinking agent is preferably not less than 2 and not more than 6 from the viewpoint of well controlling a molecular weight of the resulting crosslinked polymer and improving storage stability of the pigment water dispersion. Examples of the preferred reactive functional groups contained in the crosslinking agent include at least one group selected from the group consisting of an epoxy group, an oxazoline group and an isocyanate group.

The solubility in water of the crosslinking agent as measured by dissolving the crosslinking agent in 100 g of ion-exchanged water at 25° C. is preferably not less than 50 g, more preferably not less than 40 g and even more preferably not less than 30 g from the viewpoint of efficiently subjecting the polymer to surface crosslinking reaction.

Specific examples of the crosslinking agent include the following compounds (i) to (iii).

(i) Compound containing two or more epoxy groups in a molecule thereof:

Example of the compound (i) include polyglycidyl ethers, e.g., ethylene glycol diglycidyl ether, polyethylene glycol diglycidyl ethers such as diethylene glycol diglycidyl ether, polypropylene glycol diglycidyl ether, glycerin triglycidyl ether, glycerol polyglycidyl ether, polyglycerol polyglycidyl ether, trimethylolpropane polyglycidyl ether, cyclohexanedimethanol diglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ethers. Among these compounds (i) containing two or more epoxy groups in a molecule thereof, preferred is at least one glycidyl ether selected from the group consisting of diethylene glycol diglycidyl ether, trimethylolpropane polyglycidyl ether and cyclohexanedimethanol diglycidyl ether.

(ii) Compound containing two or more oxazoline groups in a molecule thereof:

Examples of the compound (ii) include compounds containing an aliphatic group or an aromatic group to which not less than 2, preferably 2 to 3 oxazoline groups are bonded. Specific examples of the compound (ii) include bisoxazoline compounds such as 2,2'-bis(2-oxazoline), 1,3-phenylene bisoxazoline and 1,3-benzobisoxazoline.

(iii) Compound containing two or more isocyanate groups in a molecule thereof:

Examples of the compound (iii) include organic polyisocyanates and isocyanate group-terminated prepolymers.

Specific examples of the organic polyisocyanates include aliphatic diisocyanates such as hexamethylene diisocyanate and 2,2,4-trimethylhexamethylene diisocyanate; aromatic diisocyanates such as tolylene-2,4-diisocyanate and phenylene diisocyanate; alicyclic diisocyanates; aromatic triisocyanates; and modified products of these organic polyisocyanates such as urethane-modified organic polyisocyanates. The isocyanate group-terminated prepolymers may be obtained by reacting the organic polyisocyanate or the modified product thereof with a low-molecular weight polyol, etc.

Among these crosslinking agents, preferred are the compounds (i) containing two or more epoxy groups in a molecule thereof.

The amount of the crosslinking agent used is controlled such that the mass ratio of the crosslinking agent to the crosslinkable polymer [crosslinking agent/crosslinkable polymer] is preferably from 0.1/100 to 50/100, more preferably from 1/100 to 40/100, even more preferably from 3/100 to 30/100 and further even more preferably from 4/100 to 25/100 from the viewpoint of suppressing increase in viscosity of the resulting ink.

In this case, the crosslinking rate (mol %) of the crosslinked polymer (B) as calculated according to the following calculation formula (3) is preferably not less than 5 mol %, more preferably not less than 10 mol % and even more preferably not less than 15 mol %, and is also preferably not more than 80 mol %, more preferably not more than 60 mol %, even more preferably not more than 50 mol % and further even more preferably not more than 40 mol %.

$$\text{Crosslinking rate(mol \%)} = [(\text{number of moles of reactive groups in crosslinking agent})/(\text{number of moles of reactive groups in crosslinkable polymer which are capable of reacting with reactive groups in crosslinking agent})] \times 100 \quad (3)$$

In the formula (3), the "number of moles of reactive groups in crosslinking agent" is the value obtained by multiplying the number of moles of the crosslinking agent used by the number of the reactive groups contained in a molecule of the crosslinking agent. The crosslinking rate may be calculated from the amount of the crosslinking agent used and the number of moles of the reactive groups in the crosslinking agent, and the amount of the crosslinkable polymer used and the number of moles of the reactive groups in the crosslinkable polymer which are capable of reacting with the reactive groups in the crosslinking agent.

The crosslinking reaction is preferably conducted at a temperature of 60 to 95° C. for 0.5 to 7 hours.

<Pigment Water Dispersion>

The solid content of the pigment water dispersion obtained by the aforementioned process is preferably adjusted to not less than 1% by mass and more preferably not less than 3% by mass, and also preferably controlled to not more than 30% by mass and more preferably not more than 25% by mass, from the viewpoint of improving optical density of printed characters or images and ejection stability of the pigment water dispersion.

Meanwhile, the solid content of the pigment water dispersion may be measured by the method described in Examples below.

The viscosity of the pigment water dispersion having a solid content of 20% by mass as measured at 25° C. is preferably not less than 1 mPa·s and more preferably not less than 2 mPa·s, and is also preferably not more than 12 mPa·s, more preferably not more than 9 mPa·s, even more preferably not more than 6 mPa·s and further even more preferably not more than 5 mPa·s.

The average particle size of the pigment particles contained in the pigment water dispersion is preferably not less than 40 nm, more preferably not less than 50 nm and even more preferably not less than 60 nm, and is also preferably not more than 200 nm, more preferably not more than 150 nm and even more preferably not more than 130 nm, from the viewpoint of improving dispersion stability of the pigment water dispersion as well as from the viewpoint of improving storage stability and ejection properties of the resulting ink and improving optical density of printed characters or images.

The surface tension of the pigment water dispersion as measured at 20° C. is preferably from 30 to 70 mN/m and more preferably from 35 to 65 mN/m.

[Water-Based Ink]

The water-based ink of the present invention contains the pigment water dispersion of the present invention, an organic solvent and a surfactant, and therefore is excellent in dispersion stability. For this reason, the water-based ink of the present invention can be suitably used as a water-based ink for flexographic printing, for gravure printing or for ink-jet printing. In addition, the water-based ink of the present invention is excellent in ejection properties when used in ink-jet printing methods, and therefore is preferably used as a water-based ink for ink-jet printing.

<Organic Solvent>

Examples of the organic solvent used in the water-based ink include a polyhydric alcohol, a polyhydric alcohol alkyl ether, a nitrogen-containing heterocyclic compound, an amide, an amine and a sulfur-containing compound. Of these organic solvents, preferred is at least one compound selected from the group consisting of a polyhydric alcohol, a polyhydric alcohol alkyl ether and a nitrogen-containing heterocyclic compound, and more preferred is at least one compound selected from the group consisting of a polyhydric alcohol and a nitrogen-containing heterocyclic compound.

The total content of the at least one compound selected from the group consisting of a polyhydric alcohol, a polyhydric alcohol alkyl ether and a nitrogen-containing heterocyclic compound in the organic solvent is preferably not less than 80% by mass, more preferably not less than 90% by mass, even more preferably not less than 95% by mass and further even more preferably substantially 100% by mass.

Examples of the polyhydric alcohol include ethylene glycol (boiling point (b.p.) 197° C.), diethylene glycol (b.p. 244° C.), polyethylene glycol, propylene glycol (b.p. 188° C.), dipropylene glycol (b.p. 232° C.), polypropylene glycol, 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 1,6-hexanediol (b.p. 250° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.).

Examples of the polyhydric alcohol alkyl ether include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monoisopropyl ether (b.p. 207° C.), diethylene glycol monobutyl ether (b.p. 230° C.), triethylene glycol monomethyl ether (b.p. 122° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monobutyl ether (b.p. 227° C.), dipropylene glycol monomethyl ether (b.p. 90° C.), tripropylene glycol monomethyl ether (b.p. 100° C.) and tripropylene glycol monobutyl ether. Of these polyhydric alcohol alkyl ethers, preferred are diethylene glycol monoisopropyl ether and dipropylene glycol monomethyl ether.

Examples of the nitrogen-containing heterocyclic compound include N-methyl-2-pyrrolidone (b.p. 202° C.), 2-pyrrolidone (b.p. 245° C.), 1,3-dimethyl imidazolidinone (b.p. 220° C.) and ε-caprolactam (b.p. 136° C.). Of these nitrogen-containing heterocyclic compounds, preferred are N-methyl-2-pyrrolidone and 2-pyrrolidone.

In addition, when characters or images are printed on a low-water absorbing printing medium using the water based ink, as the organic solvent, at least one polyhydric alcohol may be appropriately used in combination with at least one nitrogen-containing heterocyclic compound, from the viewpoint of improving ejection properties of the water-based ink and drying properties of the ink on the printing paper.

<Surfactant>

The surfactant contained in the water-based ink is preferably a nonionic surfactant, and more preferably an acetylene glycol-based surfactant, from the viewpoint of further improving ejection stability of the resulting ink. The acetylene glycol-based surfactant is preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-dodecyne-5,8-diol, 3,5-dimethyl-1-hexyne-3-ol and EO adducts of these compounds, more preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol and EO adducts of these compounds, and even more preferably at least one compound selected from the group consisting of 2,4,7,9-tetramethyl-5-decyne-4,7-diol and EO adducts thereof.

2,4,7,9-Tetramethyl-5-decyne-4,7-diol, 3,6-dimethyl-4-octyne-3,6-diol and 2,5-dimethyl-3-hexyne-2,5-diol can be synthesized by reacting acetylene with a ketone or an aldehyde corresponding to the aimed acetylene glycol, and may be obtained, for example, by the method described in Takehiko Fujimoto, a fully revised edition "New Introduction to Surfactants" published by Sanyo Chemical Industries, Ltd., 1992, pp. 94-107, etc.

The acetylene glycol-based surfactant is preferably such a compound that an average molar number of addition of ethyleneoxide (hereinafter also referred to merely as "EO") of the acetylene glycol is preferably not less than 5 and not more than 35, from the viewpoint of suppressing increase in viscosity of the resulting ink.

The average molar number of addition of EO of the acetylene glycol-based surfactant is preferably not less than 7, more preferably not less than 8, even more preferably not less than 9 and further even more preferably not less than 9.5, and is also preferably not more than 30 and more preferably not more than 25.

The ethyleneoxide adduct of the acetylene glycol may be produced by subjecting the acetylene glycol obtained by the aforementioned method to addition reaction with ethyleneoxide such that the number of ethyleneoxide groups added is adjusted to a desired value.

Specific examples of commercially available products of the surfactant, in particular, the acetylene glycol-based surfactant, include "SURFYNOL 104" (2,4,7,9-tetramethyl-5-decyne-4,7-diol; average molar number of addition of EO: 0 mol; active ingredient content: 100% by mass), "SURFYNOL 465" (average molar number of addition of EO: 10) and "SURFYNOL 485" (average molar number of addition of EO: 30) all available from Nissin Chemical Co., Ltd., and Air Products & Chemicals, Inc., and "ACETYLENOL E81" (average molar number of addition of EO: 8.1), "ACETYLENOL E100" (average molar number of addition of EO: 10) and "ACETYLENOL E200" (average molar number of addition of EO: 20) all available from Kawaken Fine Chemicals Co., Ltd., etc.

Examples of the other nonionic surfactant that may be used in the water-based ink include at least one compound selected from the group consisting of a polyoxyethylene alkyl phenyl ether, a polyoxyethylene aralkyl aryl ether and a polyoxyethylene alkyl ether. Examples of commercially available products of these nonionic surfactants include ""EMULGEN" available from Kao Corporation, NOIGEN" available from DKS Co., Ltd., etc.

These nonionic surfactants may be used alone or in combination of any two or more thereof.

<Contents of Respective Components in Water-Based Ink>

The content of the pigment (A) in the water-based ink is preferably not less than 1.0% by mass, more preferably not less than 2.0% by mass and even more preferably not less than 2.5% by mass from the viewpoint of enhancing optical density of printed characters or images, and is also preferably not more than 15.0% by mass, more preferably not more than 10.0% by mass, even more preferably not more than 7.0% by mass and further even more preferably not more than 5.0% by mass from the viewpoint of reducing viscosity of the resulting ink upon volatilization of the solvent therefrom to improve ejection stability of the ink.

The total content of the pigment (A) and the crosslinked polymer (B) in the water-based ink is preferably not less than 2.0% by mass, more preferably not less than 2.5% by mass, even more preferably not less than 3.0% by mass and further even more preferably not less than 3.5% by mass, and is also preferably not more than 17.0% by mass, more preferably not more than 12.0% by mass, even more preferably not more than 10.0% by mass, further even more preferably not more than 8.0% by mass and still further even more preferably not more than 6.0% by mass.

The mass ratio of the pigment (A) to the crosslinked polymer (B) [pigment (A)/crosslinked polymer (B)] in the water-based ink is preferably from 50/50 to 90/10 and more preferably from 70/30 to 85/15, from the viewpoint of improving dispersion stability of the resulting water-based ink.

The content of the ethanolamine (C) in the water-based ink is preferably not less than 0.005% by mass and not more than 6% by mass. The content of the ethanolamine (C) in the water-based ink may be appropriately adjusted by controlling the degree of neutralization of the crosslinkable polymer to a desired value.

The pH value of the water-based ink is preferably not less than 7.0, more preferably not less than 8.0 and even more preferably not less than 8.5 from the viewpoint of improving ejection stability of the resulting water-based ink, and is also preferably not more than 11.0, more preferably not more than 10.0 and even more preferably 9.5 from the viewpoint of improving resistance of members to the water-based ink and suppressing skin irritation.

The content of the organic solvent in the water-based ink is preferably not less than 10% by mass, more preferably not less than 15% by mass, even more preferably not less than 20% by mass and further even more preferably not less than 25% by mass, and is also preferably not more than 50% by mass, more preferably not more than 45% by mass, even more preferably not more than 40% by mass and further even more preferably not more than 35% by mass, from the viewpoint of improving ejection stability of the resulting water-based ink.

The content of the surfactant in the water-based ink is preferably not less than 0.1% by mass, more preferably not less than 0.2% by mass and even more preferably not less than 0.3% by mass, and is also preferably not more than 5% by mass, more preferably not more than 3% by mass and even more preferably not more than 2.5% by mass, from the viewpoint of suppressing increase in viscosity of the resulting water-based ink to improve ejection stability of the water-based ink.

The content of water in the water-based ink is preferably not less than 30% by mass, more preferably not less than 35% by mass and even more preferably not less than 40% by mass, and is also preferably not more than 80% by mass, more preferably not more than 70% by mass and even more preferably not more than 60% by mass, from the viewpoint of reducing burden on the environment.

The water-based ink of the present invention may be produced by adding the organic solvent, the surfactant and water to the pigment water dispersion of the present invention, followed by mixing these components. The water-based ink of the present invention may further contain various additives that may be used in ordinary water-based inks, such as a wetting agent, a penetrant, a dispersant, a viscosity controller, a defoaming agent, a mildew-proof agent, a rust preventive, an ultraviolet absorber and the like, if required.

(Properties of Water-Based Ink)

The pH value of the water-based ink as measured at 20° C. is preferably not less than 5.5, more preferably not less than 6.0 and even more preferably not less than 6.5 from the viewpoint of improving ejection stability of the resulting water-based ink, and is also preferably not more than 11.0, more preferably not more than 10.0, even more preferably not more than 9.5 and further even more preferably not more than 9.0 from the viewpoint of improving resistance of members to the water-based ink and suppressing skin irritation.

Meanwhile, the pH value of the water-based ink as measured at 20° C. may be measured by the method described in Examples below.

The viscosity of the water-based ink as measured at 20° C. is preferably not less than 2.0 mPa·s, more preferably not less than 3.0 mPa·s and even more preferably not less than 3.5 mPa·s from the viewpoint of improving ejection stability of the resulting water-based ink, and is also preferably not more than 12 mPa·s, more preferably not more than 9.0 mPa·s, even more preferably not more than 7.0 mPa·s, further even more preferably not more than 5.5 mPa·s and still further even more preferably not more than 4.5 mPa·s from the same viewpoint as described above.

<Printing Method>

The printing method using the water-based ink of the present invention is preferably an ink-jet printing method.

The method of ejecting the water-based ink may be either a piezoelectric method or a thermal method, and the printing method used in the present invention is more preferably a thermal ink-jet printing method. The thermal ink-jet printing method is such a method in which a thermal energy is applied to an ink, so that the ink undergoes a rapid change in its volume and is ejected from nozzles by an acting force exerted onto the ink owing to such a volume change. For example, a basic principle of the preferred thermal ink-jet printing method is disclosed in U.S. Pat. Nos. 4,723,129 and 4,740,796. More specifically, as the thermal ink-jet printing method, there may be mentioned the method described in JP 61-59911B, etc.

EXAMPLES

In the following Examples and Comparative Examples, the "part(s)" and "%" indicate "part(s) by mass" and "% by mass", respectively, unless otherwise specified.

Meanwhile, various properties of the polymers, the water dispersions, the ethanolamines and the like as used in the following Examples and Comparative Examples were measured and evaluated by the following methods.

(1) Measurement of Number-Average Molecular Weight of Crosslinkable Polymer (B)

The number-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min)] using a solution prepared by dissolving phosphoric acid (guaranteed reagent) available from Wako Pure Chemical Industries, Ltd., and lithium bromide (reagent) available from Tokyo Chemical Industry Co., Ltd., in N,N-dimethylformamide (for high-performance liquid chromatography) available from Wako Pure Chemical Industries, Ltd., such that the concentrations of phosphoric acid and lithium bromide in the resulting solution were 60 mmol/L and 50 mmol/L, respectively, as an eluent, and using monodisperse polystyrenes having known molecular weights as a reference standard substance.

(2) Measurement of Solid Content of Water Dispersion

Ten grams (10.0 g) of sodium sulfate dried to constant weight in a desiccator were weighed and charged into a 30 mL polypropylene container (ϕ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(3) Measurement of pKa of Ethanolamine

The pKa value of the ethanolamine was measured using a potentiometric automatic titration device "AT-610" (tradename) available from Kyoto Electronics Manufacturing Co., Ltd. In the measurement, an aqueous solution to which the ethanolamine was added was prepared (measuring concentration: about $1.0 \times 10^{-3}$% by mass), and subjected to potentiometric titration using 0.1 N hydrochloric acid to measure the pKa value of the ethanolamine.

(4) Evaluation of Dispersion Stability

A screw vial was charged with a water-based ink containing a pigment water dispersion and a stirrer, and the contents of the screw vial were stirred while blowing nitrogen thereto, to thereby concentrate the water-based ink to a predetermined concentration (concentration: 50%). The viscosity of the ink concentrated was measured using a rheometer "Physica MCR301" (tradename) available from Anton Paar GmbH (measuring conditions: temperature: 25° C.; shear rate: 10 to 1000 s$^{-1}$). The dispersion stability of the water-based ink was evaluated according to the following evaluation ratings.

(Evaluation Ratings)

A: Viscosity of the water-based ink concentrated as measured at a shear rate of 10 s$^{-1}$ was less than 9.8 mPa.

B: Viscosity of the water-based ink concentrated as measured at a shear rate of 10 s$^{-1}$ was not less than 9.8 mPa and less than 10.6 mPa.

C: Viscosity of the water-based ink concentrated as measured at a shear rate of 10 s$^{-1}$ was not less than 10.6 mPa and less than 11.1 mPa.

D: Viscosity of the water-based ink concentrated as measured at a shear rate of 10 s$^{-1}$ was not less than 11.1 mPa.

(5) Evaluation of Ejection Properties of Ink

The ejection properties of the water-based ink were evaluated using a thermal ink-jet printer "LPP-6010N" (tradename) available from LG Electronics Inc.

In the evaluation for ejection properties of the water-based ink, after conducting solid image printing on a plain paper (216 mm in width×279 mm in length) available from Oji Paper Co., Ltd., the printing was stopped and suspended for a predetermined period of time, and then started again under the printing conditions: kind of printing paper: plain paper; mode set: Best Mode. If no missing dots were caused in the printed image upon restarting the printing, it was recognized that the water-based ink was ejectable, whereas if any missing dots were caused in the printed image upon restarting the printing, it was recognized that the water-based ink was non-ejectable. In addition, the time period of stopping and suspending the solid image printing which was elapsed until causing the missing dots in the printed image upon restarting the printing was defined as a decap time, and it was recognized that as the decap time became longer, the ejection properties of the water-based ink was more excellent.

Meanwhile, the term "decap time" means the length of time over which a droplet of ink can be still ejected from an ink-jet print head even after allowing the ink-jet print head filled with the ink to stand in an uncapped idle state.

(Evaluation Ratings)

A: Decap time was not shorter than 30 minutes.

B: Decap time was not shorter than 15 minutes and shorter than 30 minutes.

C: Decap time was not shorter than 1 minute and shorter than 15 minutes.

D: Decap time was shorter than 1 minute.

Example 1

(1) Preliminary Dispersion Step

Five hundred eighty two grams (582 g) of a methyl ethyl ketone solution containing 36.8% of a carboxy group-containing crosslinkable polymer (a copolymer of benzyl acrylate, a styrene macromonomer "AS-6S" available from Toagosei Co., Ltd., methacrylic acid and polyethylene glycol (4) monomethacrylate; acid value: 130 mgKOH/g; number average molecular weight: 11,218) (hereinafter also referred to merely as a "polymer solution") were mixed with 1681 g of ion-exchanged water, 80.4 g of n-butyl diethanolamine (pKa: 8.86) (in such an amount that a degree of neutralization of the polymer was 80%) and 212.9 g of methyl ethyl ketone, thereby obtaining an emulsion.

The thus obtained emulsion was mixed with 500 g of a black pigment "NIPEX160IQ" (gas black) available from Evonik Degussa GmbH, and the resulting mixture was mixed at 15° C. for 1 hour using a disper blade, thereby obtaining a preliminary dispersion (content of non-volatile components therein as calculated according to the aforementioned calculation formula (2): 20%) (step I).

(2) Substantial Dispersion Step

Sixty nine grams (69 g) of methyl ethyl ketone and 841 g of ion-exchanged water were added to the preliminary dispersion obtained in the aforementioned step (1). The resulting dispersion was subjected to dispersion treatment by a continuous method of passing the dispersion through a high-pressure homogenizer "MICROFLUIDIZER" (tradename) available from Microfluidics Corporation under a pressure of 150 MPa 15 times, thereby obtaining a dispersion (step I).

(3) Removal of Organic Solvent

The dispersion obtained in the aforementioned step (2) was maintained under reduced pressure to remove methyl ethyl ketone therefrom using a warm water heating medium, and further water was removed from the dispersion such that the solid content of the resulting pigment water dispersion was 20% (the content of the residual organic solvent in the pigment water dispersion was 0.01%). The obtained pigment water dispersion was subjected to filtration treatment using a 2.5 μm-mesh filter "20L-MPX-025XS" (tradename; outer diameter: 9.1 cm) available from ROKI TECHNO CO., LTD., to remove coarse particles therefrom, thereby obtaining a water dispersion having a solid content of 20% (step II).

(4) Crosslinking Step

Next, 2.02 g of a crosslinking agent "DENACOL EX850L" (diethylene glycol diglycidyl ether) available from Nagase ChemteX Corporation was added to 200 g of the water dispersion obtained in the aforementioned step (3), and the resulting mixture was stirred at 70° C. for 90 minutes, thereby obtaining a pigment water dispersion having a solid content of 20% and containing a crosslinked polymer B1 obtained by crosslinking the aforementioned crosslinkable polymer (step III). The crosslinking reaction was conducted such that the crosslinking rate of the crosslinkable polymer was 20 mol %.

(5) Preparation of Water-Based Ink

Then, 6.79 parts of the resulting pigment water dispersion were mixed with 8.3 parts of ethylene glycol as an organic solvent, 5 parts of modified glycerin "Liponic EG-1" (ethoxylated glycerin; average molar number of addition of ethyleneoxy groups: 26; wetting agent) available from Lipo Chemicals Inc., 1.3 parts of a mixture containing "SURFYNOL 104" (acetylene glycol-based surfactant; 2,4,7,9-tetramethyl-5-decyne-4,7-diol) available from Nissin Chemical Co., Ltd., "EMULGEN 120" (nonionic surfactant; polyoxyethylene lauryl ether) available from Kao Corporation and water at a mixing ratio of 1:1:1, and 0.05 part of "SILFACE SAG-002" (polyether-modified silicone; surface modifier) available from Nissin Chemical Co., Ltd., such that the water content of the resulting mixed solution was adjusted to 78.61%.

The thus obtained mixed solution was subjected to filtration treatment using a 0.3 μm-mesh filter "20L-MBP-003XS" (tradename; outer diameter: 9.1 cm) available from ROKI TECHNO CO., LTD., in the same manner as in Example 1 (3), thereby obtaining a water-based ink.

The evaluation results of the thus obtained water-based ink are shown in Table 1.

Example 2

The same procedure as in Example 1 was repeated except that the neutralizing agent used in the preliminary dispersion step (1) of Example 1 was replaced with t-butyl diethanolamine (pKa: 8.74), thereby obtaining a pigment water dispersion containing the crosslinked polymer B1, and a water-based ink. The results are shown in Table 1.

Example 3

The same procedure as in Example 1 was repeated except that the crosslinking agent "DENACOL EX850L" used in the crosslinking step (4) of Example 1 was replaced with a crosslinking agent "DENACOL EX-216L" (cyclohexanedimethanol diglycidyl ether) available from Nagase ChemteX Corporation, thereby obtaining a pigment water dispersion containing a crosslinked polymer B2, and a water-based ink. The results are shown in Table 1.

Example 4

The same procedure as in Example 2 was repeated except that the crosslinking agent "DENACOL EX850L" used in Example 2 was replaced with a crosslinking agent "DENACOL EX-216L" (cyclohexanedimethanol diglycidyl ether) available from Nagase ChemteX Corporation, thereby obtaining a pigment water dispersion containing the crosslinked polymer B2, and a water-based ink. The results are shown in Table 1.

Example 5

The same procedure as in Example 1 was repeated except that the crosslinking agent "DENACOL EX850L" used in the crosslinking step (4) of Example 1 was replaced with a crosslinking agent "DENACOL EX-321L" (trimethylolpropane polyglycidyl ether) available from Nagase ChemteX Corporation, thereby obtaining a pigment water dispersion containing a crosslinked polymer B3, and a water-based ink. The results are shown in Table 1.

Example 6

The same procedure as in Example 2 was repeated except that the crosslinking agent "DENACOL EX850L" used in Example 2 was replaced with a crosslinking agent "DENACOL EX-321L" (trimethylolpropane polyglycidyl ether) available from Nagase ChemteX Corporation, thereby obtaining a pigment water dispersion containing the crosslinked polymer B3, and a water-based ink. The results are shown in Table 1.

Example 7

The same procedure as in Example 1 was repeated except that in the preliminary dispersion step (1) of Example 1, 88.4 g of of n-butyl diethanolamine (in such an amount that a degree of neutralization of the polymer was 90%) was used, and in the crosslinking step (4) of Example 1, the crosslinking rate (in the step III) was changed to 10 mol %, thereby obtaining a pigment water dispersion containing the crosslinked polymer B1, and a water-based ink. The results are shown in Table 1.

Comparative Example 1

The same procedure as in Example 1 was repeated except that the neutralizing agent used in the preliminary dispersion step was replaced with triethanolamine, thereby obtaining a pigment water dispersion and a water-based ink. The results are shown in Table 1.

Comparative Example 2

The same procedure as in Example 1 was repeated except that the neutralizing agent used in the preliminary dispersion step was replaced with tris[2-(2-methoxyethoxy)ethyl]amine, thereby obtaining a pigment water dispersion and a water-based ink. The results are shown in Table 1.

Comparative Example 3

The same procedure as in Example 1 was repeated except that the neutralizing agent used in the preliminary dispersion step was replaced with sodium hydroxide, thereby obtaining a pigment water dispersion and a water-based ink. The results are shown in Table 1.

TABLE 1

|  | Pigment (A) | Crosslinked polymer (B) | Crosslinking agent | Ethanolamine (C) | pKa | Dispersion stability | Ejection properties |
|---|---|---|---|---|---|---|---|
| Example 1 | Carbon black | Polymer B1 | EX850L | n-Butyl diethanolamine | 8.86 | A | A |
| Example 2 | Carbon black | Polymer B1 | EX850L | t-Butyl diethanolamine | 8.74 | B | B |
| Example 3 | Carbon black | Polymer B2 | EX216L | n-Butyl diethanolamine | 8.86 | B | B |
| Example 4 | Carbon black | Polymer B2 | EX216L | t-Butyl diethanolamine | 8.74 | C | B |
| Example 5 | Carbon black | Polymer B3 | EX321L | n-Butyl diethanolamine | 8.86 | C | C |
| Example 6 | Carbon black | Polymer B3 | EX321L | t-Butyl diethanolamine | 8.74 | C | C |
| Example 7 | Carbon black | Polymer B1 | EX850L | n-Butyl diethanolamine | 8.86 | C | C |
| Comparative Example 1 | Carbon black | Polymer B1 | EX850L | Triethanolamine | 7.72 | D | D |
| Comparative Example 2 | Carbon black | Polymer B1 | EX850L | Tris[2-(2-methoxyethoxy)ethyl]amine | 7.48 | D | D |
| Comparative Example 3 | Carbon black | Polymer B1 | EX850L | NaOH | — | D | D |

From Table 1, it was confirmed that the water-based inks obtained in Examples 1 to 7 were excellent in dispersion stability, and also excellent in ejection properties even when used as an ink for ink-jet printing, as compared to the water-based inks obtained in Comparative Examples 1 to 3.

The invention claimed is:

1. A pigment water dispersion comprising (A) a pigment, (B) a carboxy group-containing crosslinked polymer and (C) an alkyl group-containing ethanolamine having an acid dissociation constant (pKa) of not less than 8.7,
    wherein the ethanolamine (C) comprises an alkyl group having not less than 3 and not more than 20 carbon atoms;
    wherein the crosslinked polymer (B) is a polymer crosslinked with a compound comprising two or more epoxy groups in a molecule thereof, and
    the compound comprising two or more epoxy groups in a molecule thereof is at least one glycidyl ether selected from the group consisting of diethylene glycol diglycidyl ether, trimethylolpropane polyglycidyl ether and cyclohexanedimethanol diglycidyl ether.

2. The pigment water dispersion according to claim 1, wherein the ethanolamine (C) is at least one compound selected from the group consisting of monoethanolamine and diethanolamine each comprising an alkyl group having not less than 4 and not more than 20 carbon atoms.

3. The pigment water dispersion according to claim 1, wherein the ethanolamine (C) is diethanolamine.

4. The pigment water dispersion according to claim 1, wherein the ethanolamine (C) is diethanolamine having not less than 4 and not more than 8 carbon atoms.

5. The pigment water dispersion according to claim 1, wherein the crosslinked polymer (B) is in the form of a copolymer comprising a constitutional unit derived from at least one compound selected from the group consisting of methacrylic acid and acrylic acid.

6. The pigment water dispersion according to claim 1, wherein the acid dissociation constant (pKa) of the ethanolamine (C) is not less than 8.7 and not more than 9.2.

7. A water-based ink comprising the pigment water dispersion according to claim 1, an organic solvent and a surfactant.

8. A process for producing a pigment water dispersion, comprising the following steps (I) to (III):
    Step (I): subjecting a mixture comprising (A) a pigment, a carboxy group-containing crosslinkable polymer, (C) an alkyl group-containing ethanolamine having an acid dissociation constant (pKa) of not less than 8.7, an organic solvent and water to dispersion treatment, thereby obtaining a dispersion of pigment-containing polymer particles comprising the pigment (A) and the crosslinkable polymer that is adhered onto the pigment (A);
    Step (II): removing the organic solvent from the dispersion obtained in the step (I), thereby obtaining a water dispersion of the pigment-containing polymer particles; and
    Step (III): subjecting the crosslinkable polymer constituting the pigment-containing polymer particles obtained in the step (II) to crosslinking reaction with a crosslinking agent, thereby obtaining the pigment water dispersion comprising pigment-containing crosslinked polymer (B) particles.

9. The process for producing a pigment water dispersion according to claim 8, wherein the crosslinking agent is a compound comprising two or more epoxy groups in a molecule thereof.

10. The process for producing a pigment water dispersion according to claim 8, wherein a content of the ethanolamine (C) in the mixture used in the step (I) is not less than 0.1% by mass and not more than 12% by mass.

11. The process for producing a pigment water dispersion according to claim 8, wherein a degree of neutralization of the carboxy group in the crosslinkable polymer in the step (I) is not less than 30 mol %.

12. The process for producing a pigment water dispersion according to claim 8, wherein a content of the crosslinkable polymer in the mixture used in the step (I) is not less than 2% by mass and not more than 40% by mass.

13. A process for producing a water-based ink, comprising the step of mixing the pigment water dispersion obtained by the process according to claim 8, an organic solvent and a surfactant.

14. The process for producing a pigment water dispersion according to claim 8, wherein the ethanolamine (C) is at least one compound selected from the group consisting of monoethanolamine and diethanolamine each comprising an alkyl group having not less than 4 and not more than 20 carbon atoms.

15. The process for producing a pigment water dispersion according to claim 8, wherein the crosslinking agent is at least one glycidyl ether selected from the group consisting of diethylene glycol diglycidyl ether, trimethylolpropane polyglycidyl ether and cyclohexanedimethanol diglycidyl ether.

* * * * *